UNITED STATES PATENT OFFICE.

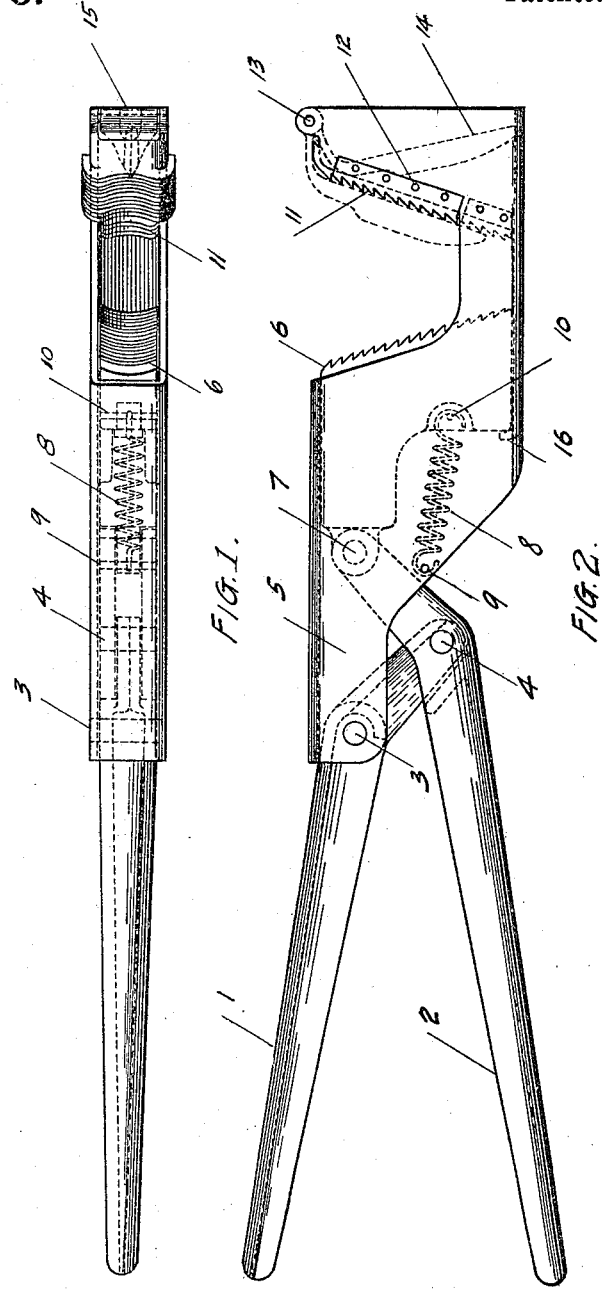

ROBERT C. SHARPE AND EDWARD C. SHARPE, OF YOUNGSTOWN, OHIO.

MACHINE OR INSTRUMENT FOR CRACKING NUTS.

1,205,276.  Specification of Letters Patent.  Patented Nov. 21, 1916.

Application filed March 29, 1915. Serial No. 17,826.

*To all whom it may concern:*

Be it known that we, ROBERT C. SHARPE and EDWARD C. SHARPE, citizens of the United States, residing in the city of Youngstown, in the county of Mahoning and State of Ohio, have invented a new and useful Machine or Instrument for Cracking Nuts, of which the following is a specification, reference being had therein to the accompanying drawing.

Our invention relates to useful improvements in a nut cracking machine by which it is not necessary to hold the nut in the fingers, but simply to place it in the machine.

A further object is to provide a safe and easily operated machine, capable of cracking the hardest nut by only a slight pressure on the handles, and to crack nuts of all kinds and sizes without breaking the kernel,—a chisel shaped cutting blade being provided which will split the shells of nuts offering excessive resistance to pressure and whose kernels can be best and easiest removed by this method.

The construction of the machine will be fully described in connection with the accompanying drawing which forms a part of this specification, and the novel and characteristic features of the invention will be defined in the appended claims.

In the drawings Figure #1 is a plan view of the machine and Fig. #2 is a side elevation of the same.

The machine consists of handles #1 and #2 which are attached together by means of pin #4. The handle #1 going through the extended front end of the stationary gripper #5 is fulcrumed upon pin #3. The end of handle #2 is then connected to the movable gripper #6 by means of pin #7. A coiled spring #8 is connected on the front end by pin #9 to the stationary gripper #5 and on the rear end of the movable gripper #6 by pin #10 for the purpose of pulling back the movable gripper #6 quickly and thereby throwing apart handles #1 and #2 automatically. The movable gripper #6 is guided into the extended front end of the stationary gripper #5 and is provided on its front end with a concave nut gripping surface, the face of which slopes downward, its lower end slanting toward the stationary gripper, whose purpose is to keep the nut from moving sidewise or upward and for cracking the shells or nuts uniformly all around. Stop #16 on the bottom part of the stationary gripper #5 regulates the distance the movable gripper #6 can recede from the stationary gripper #5. On the rear end of the stationary gripper #5 is formed the concave toothed nut gripper #11, which extends downward to the bottom of the space formed by the cut out sides of the stationary gripper #5. This space forms a very convenient and satisfactory receptacle in which a nut can be placed without any danger of its rolling out sidewise. The space between the gripping face of this stationary gripper #11 and the gripping face of the movable gripper #6 is sufficient to accommodate the largest sized nut and both jaws having concave teeth, sloping downward they can easily crack the shell of any nut uniformly all around by means of only a slight pressure on the levers #1 and #2. The gripping face of the stationary gripper #11 is supported and held rigid by bending the sides of the part forming the teeth over and riveting the same with rivets #12 on each side of the rear end of the stationary gripper #5. At the top of the rear end of the stationary gripper #5 lip supports are formed for holding the pin #13 which carries knife blade #14, which when not in use is concealed in the open rear end of the stationary gripper #5 as shown by the dot and dash outline.

The operation of the machine is as follows:—The nut which it is desired to crack is placed in the receptacle formed by the cut out sides of the stationary gripper #5 engaged with the concave surfaces of both grippers. The handles #1 and #2 are then squeezed together until the shell of the nut is felt to crack, ample leverage being given to the handles for this purpose. The handles are then released and the coiled spring #8 draws back the movable gripper #6 quickly and the concave surface of movable gripper #6 thereby releases the nut, which is then ejected by simply turning the machine over. For splitting the shells of very hard nuts whose kernels are so placed that they can be more easily removed by cutting, the knife blade #14 is swung into its operating position, shown dotted, simply by turning the lug #15 until the back of the knife blade rests against the concave surface of the stationary gripper #5. The nut which it is desired to split is then placed in position and the machine operated as above described.

We would have it understood that the invention is not restricted to the exact detail construction shown and described, as various modifications in the construction and the relative arrangement of the parts may be resorted to without departing from the spirit of the invention, and the scope of the following claims.

What we claim and desire to secure as Letters Patent is:—

1. In a mechanical nut cracker, a combination of a stationary gripper, to the extended end of which a movable handle is fastened by a pivot, a second movable handle being fastened to one end of this handle also by a pivot, and one end of this handle inserted into one end of a movable gripper and pivoted to it, said movable gripper inserted into an extended part of the stationary gripper, a coiled spring fastened to the extended ends of both grippers by means of pivots and an adjustable cutting blade fastened to the top part of the rear end of the stationary gripper, substantially as shown.

2. In a mechanical nut cracker, a combination of a stationary and a movable gripper, substantially as described, a part of the top of the rear end of the stationary gripper forming ears for carrying a pin and cutting blade with a V shaped cutting edge, which when placed in the operating position as above described and with its cutting edge opposite the movable gripper will act as a cutter of nut shells substantially as described.

In testimony whereof we affix our signatures in the presence of two witnesses.

ROBERT C. SHARPE.
EDWARD C. SHARPE.

Witnesses:
HAZEL M. MOORHOUSE,
JOHN GARBARIN.

Copies of this patent may be obtained for five cents each, by addressing the "Commissioner of Patents, Washington, D. C."